(12) United States Patent
Li

(10) Patent No.: US 8,042,957 B2
(45) Date of Patent: Oct. 25, 2011

(54) HEIGHT ADJUSTMENT DEVICE WITH FINE TUNING FOR AN IMAGE SYSTEM

(75) Inventor: Hsin-Hung Li, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 480 days.

(21) Appl. No.: 12/187,391

(22) Filed: Aug. 7, 2008

(65) Prior Publication Data

US 2009/0039227 A1 Feb. 12, 2009

(30) Foreign Application Priority Data

Aug. 9, 2007 (TW) ................................ 96129407 A

(51) Int. Cl.
*G03B 21/14* (2006.01)
(52) U.S. Cl. ...................... 353/119; 353/122; 248/188.2
(58) Field of Classification Search ............... 248/188.2, 248/188.1, 188.8, 677; 353/119, 69, 70, 353/122; 352/243, 244, 242
See application file for complete search history.

(56) References Cited

U.S. PATENT DOCUMENTS

| | | | |
|---|---|---|---|
| 6,119,605 A * | 9/2000 | Agee | 108/147 |
| 6,793,348 B2 * | 9/2004 | Lee et al. | 353/119 |
| 7,318,570 B2 * | 1/2008 | Lin et al. | 248/188.2 |
| 7,467,769 B2 * | 12/2008 | Shao et al. | 248/188.2 |
| 2006/0169853 A1 * | 8/2006 | Lin et al. | 248/188.2 |
| 2006/0202095 A1 * | 9/2006 | Shao et al. | 248/188.2 |

* cited by examiner

*Primary Examiner* — A. Joseph Wujciak, III

(57) ABSTRACT

Through combination of gears with different sizes in a transformation gear set configured in the height adjustment device, the height adjustment device can be fine-tuned. When an actuator of the height adjustment device is pressed, a first gear engaging with the actuator rotates and has a first relative distance with the actuator while a second gear engaging with a rack of the supporter has a second relative distance with the rack. The second relative distance is shorter than the first relative distance and the supporter is adjusted in a large scale and is fine-tuned through operating one single actuator.

17 Claims, 6 Drawing Sheets

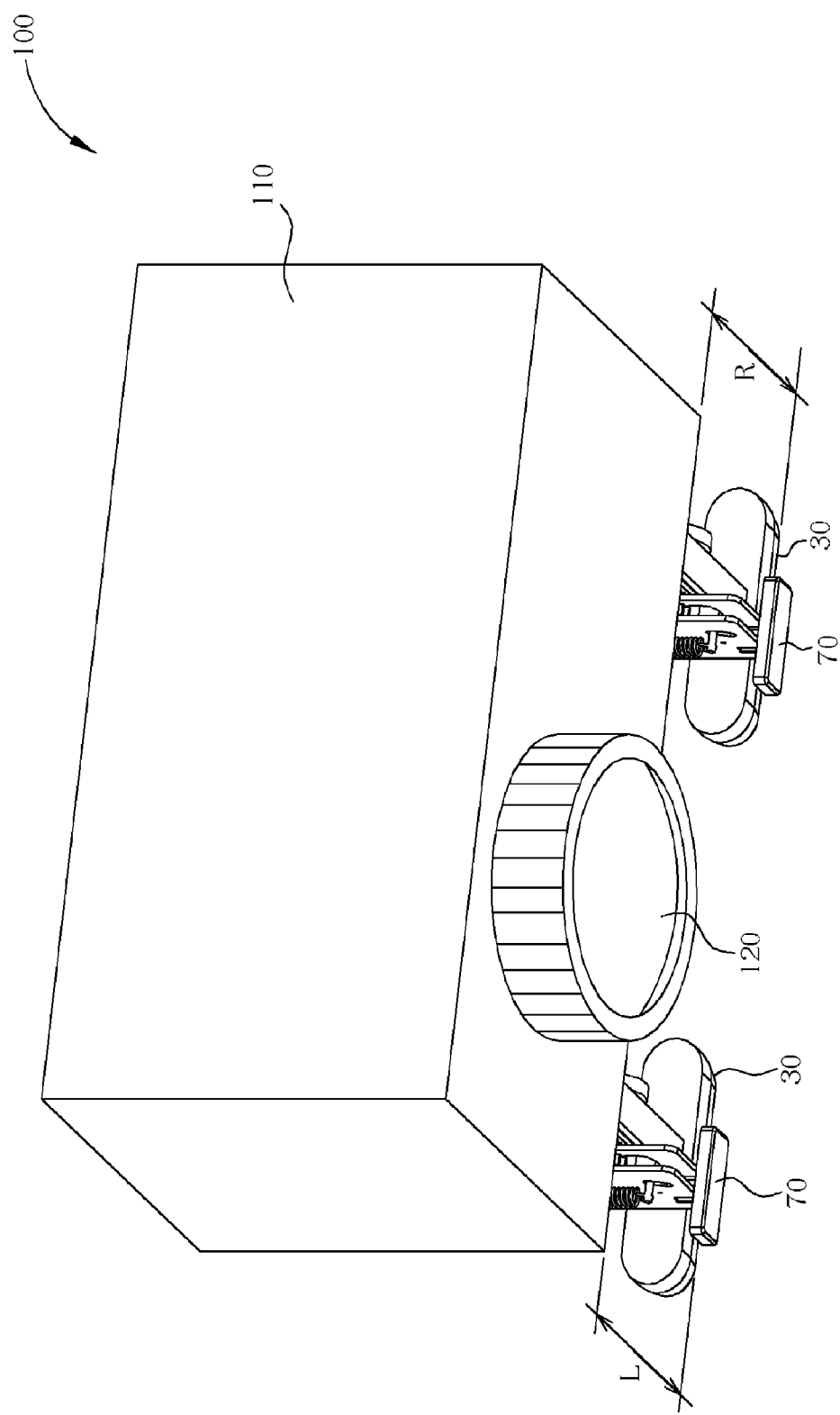

HEIGHT ADJUSTMENT DEVICE WITH FINE TUNING FOR AN IMAGE SYSTEM

BACKGROUND OF THE INVENTION

1. Field of the Invention

The present invention relates to a height adjustment device, and more specifically, to a height adjustment device with fine-tuning for an image system.

2. Description of the Prior Art

Image systems like projectors at the present time are usually either configured on the ceiling to cast images onto a project screen in a nearly horizontal way or on a desk and cast images in an elevation angle. Except for the first way to fix the projectors on the ceiling, which is generally used in a large meeting room environment, as the portability of presentation systems or movie playback systems is concerned, most projectors with high mobility adopt the second way, i.e., to place the projector on a surface (generally on a desk lower than the project screen) and by providing the adjustability of the projection lens' height and of the built-in trapezoid distortion parameter of the projectors, the images can be cast on a wall or the project screen.

The conventional height adjustment devices of a projector can be categorized in two. A first type has rack with fixed teeth distance and to adjust the height of the adjustment device, simply press an actuator that engages with the rack to release the rack so that the adjustment device can be adjusted to a needed height. Afterward, the actuator engages with the rack again to keep the adjustment device at the needed height. The first type of the height adjustment devices provides fast adjustment for configuring the projector but the precision for adjusting the height is also limited by the fixed distance of the rack and is rather rough due to manufacture limitation of the rack.

A second type of conventional height adjustment devices utilizes screw for height adjusting, which has very high precision. However, this type of height adjustment devices is too poor in efficiency for adjustment compared to the previous first type height adjustment devices since rotating the screw every single round only moves the height adjustment device a tooth distance of the screw in height.

An improved height adjustment device combining the features of both previous two types utilizes a latch to engage with the screw. The screw can move in a large scale with the latch disengaged and also rotate in a fine scale with the latch engaged. Such type of height adjustment device is also disclosed in the Taiwan patent #528,916. Even so, it always requires two separate operations to satisfy the requirement of precision and efficiency for the height adjustment devices in image systems such as the projectors. Situations below happen quite frequently: users know how to operate one operation (adjusting in a large scale or fine-tuning) while the other operation is always forgotten.

SUMMARY OF THE INVENTION

The present invention provides a height adjustment device with fine-tuning for an image system. The height adjustment device comprises a base, a transformation gear set, a supporter, and an actuator. The transformation gear set is configured on the base and has a first gear and a second gear. The supporter is capable of moving relative to the base and has a rack for engaging with the second gear of the transformation gear set. The actuator is configured on the base for detachably engaging with the first gear of the transformation gear set for stopping the first gear and the second gear. When the actuator disengages from the first gear and when the first gear rotates and has a first relative distance with the actuator, the second gear rotates and has a second relative distance with the racks and the first relative distance is longer than the second relative distance.

The present invention also provides an image system having height adjustment device with fine-tuning. The image system comprises a housing, a lens set, and at least one height adjustment device. The lens set is configured in the housing for projecting an image onto a surface. The height adjustment device is configured at the bottom of the housing. The height adjustment device comprises a base, a transformation gear set, a supporter, and an actuator. The base is connected to the bottom of the housing. The transformation gear set is configured on the base and has a first gear and a second gear. The supporter is capable of moving relative to the base and has a rack for engaging with the second gear of the transformation gear set. The actuator is configured on the base for detachably engaging with the first gear of the transformation gear set for stopping the first gear and the second gear. When the actuator disengages from the first gear and when the first gear rotates and has a first relative distance with the actuator, the second gear rotates and has a second relative distance with the racks and the first relative distance is longer than the second relative distance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is an illustration of an image system having height adjustment device with fine-tuning according to the present invention.

DETAILED DESCRIPTION

Figure 1:
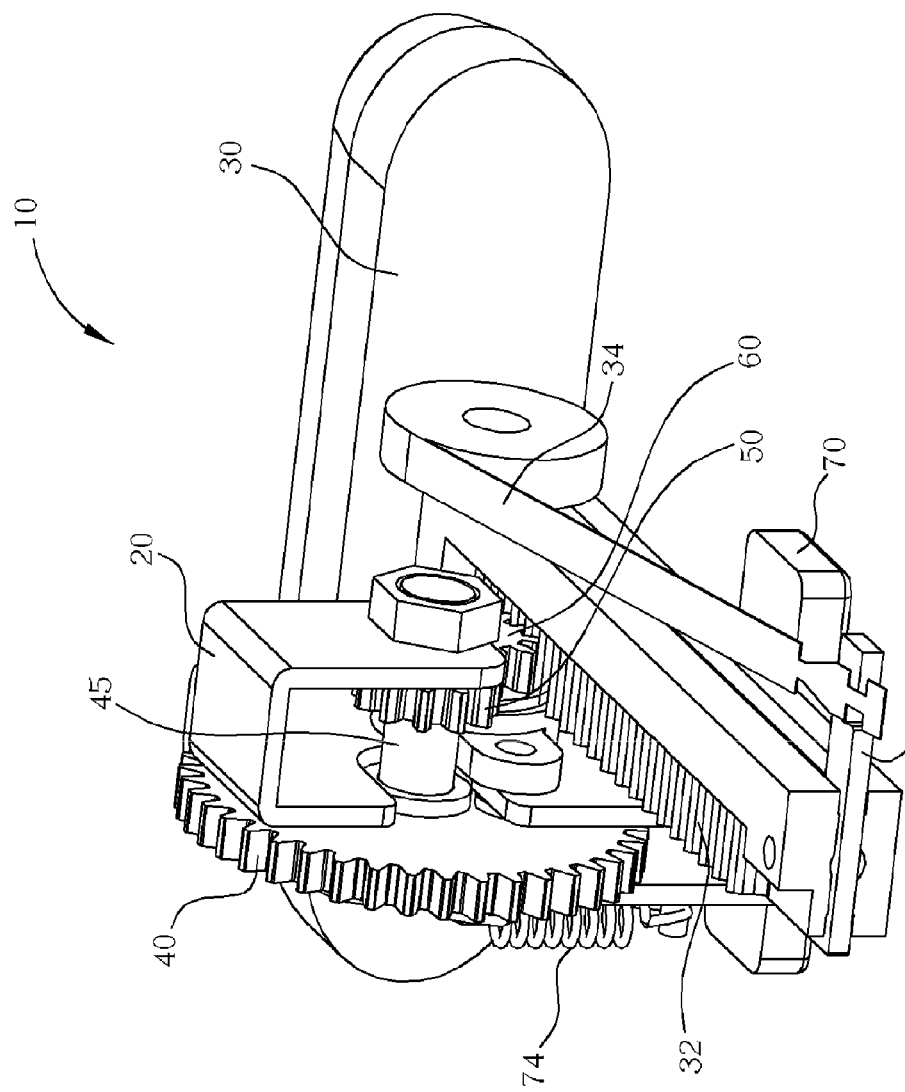
FIG. 1 is an illustration of an exemplary embodiment of the height adjustment device according to the present invention.
Figure 2:
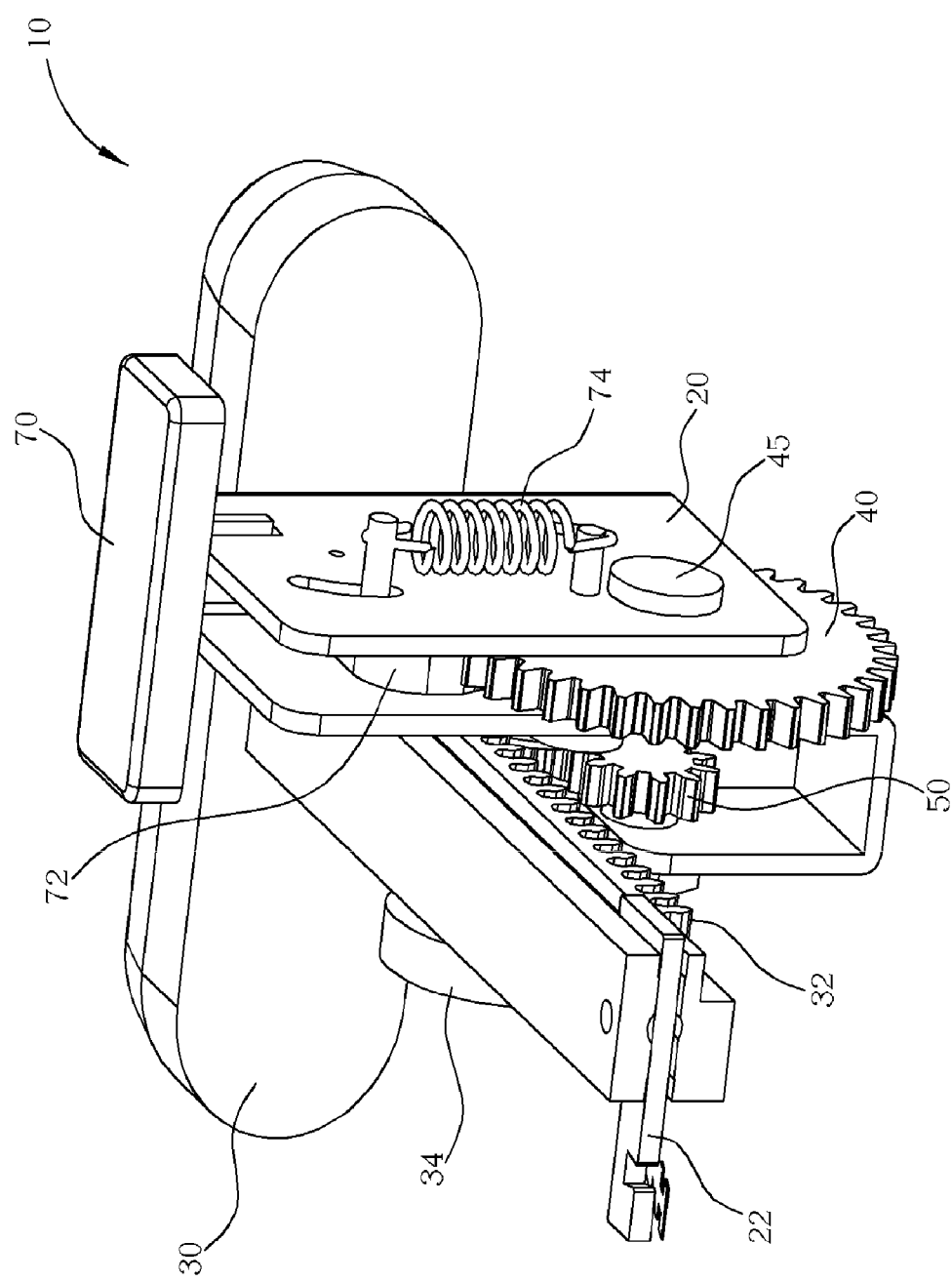
FIG. 2 is an illustration of another view of the exemplary embodiment in FIG. 1.
Figure 3:
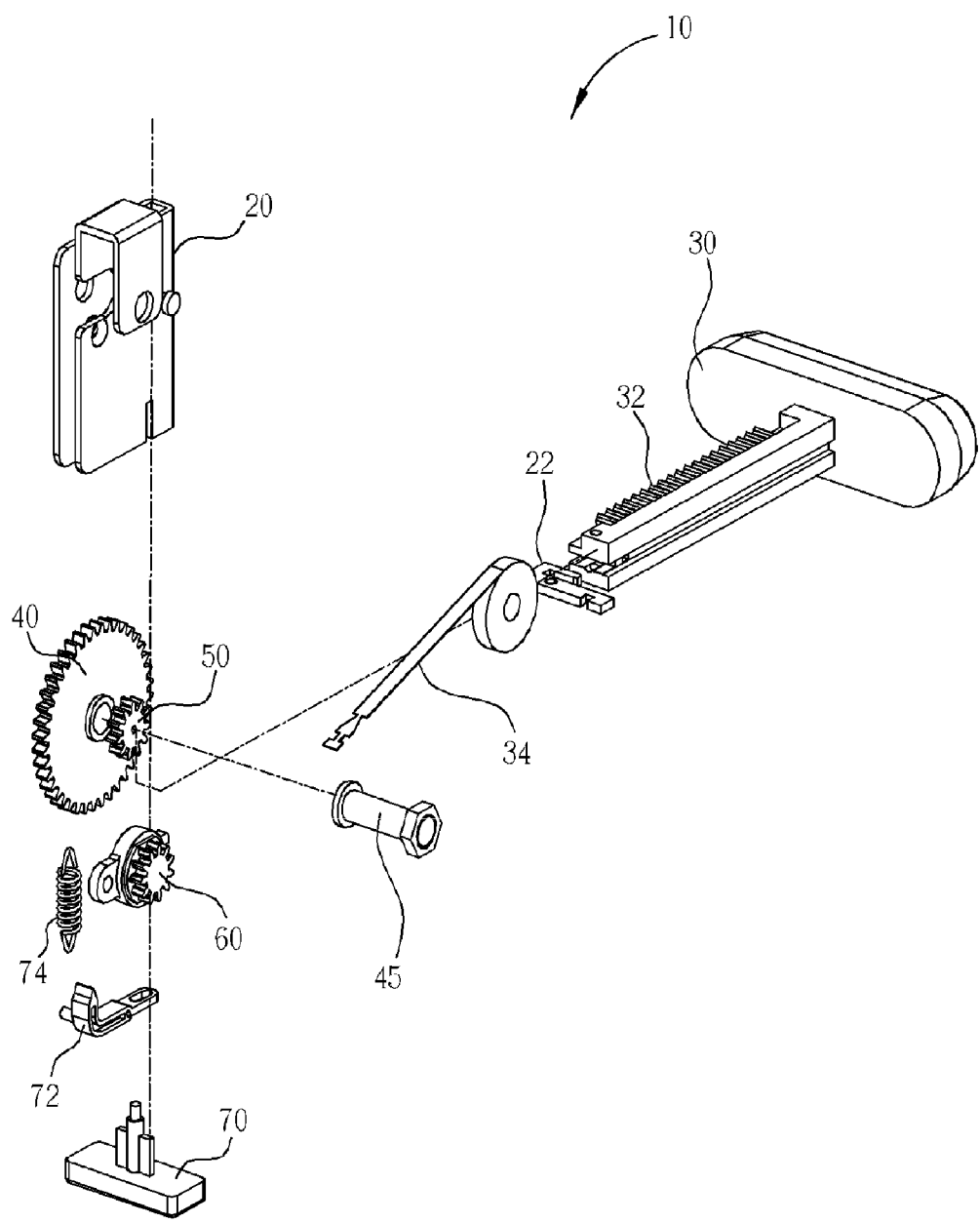
FIG. 3 is an illustration of exploded view of the height adjustment device according to the present invention.

Reference is made to FIG. 1 to FIG. 3. FIG. 1 illustrates an exemplary embodiment of the height adjustment device 10 according to the present invention. The height adjustment device 10 is mainly used for image systems such as projectors; however, the present invention can also be used for any devices whose height needs to be adjusted, whether partial height adjustment or overall height adjustment, during operation. As FIG. 6 shows, the projector 100 comprises a housing 110, and a lens set 120 configured on the housing 110 is for casting an image onto a surface (not shown in the figure). Down on the front bottom of the housing 100 corresponding to the side where the lens set 120 locates has two height adjustment devices 10, each configured at the left and the right of the front bottom of the housing 110 respectively. The two height adjustment devices 10 can adjust the left side height L and the right side height R of the projector 100 respectively so that the height of the projector 100 is adjusted and the lens set 120 is capable of casting images onto proper position. FIG. 2 is an illustration of another view of the exemplary embodiment of the height adjustment device 10 in FIG. 1. FIG. 3 is an illustration of exploded view of each component of the height adjustment device 10 according to the present invention. The height adjustment device 10 comprises a base 20, a supporter 30, a first gear 40, a second gear 50, a damping gear 60, and an actuator 70. The height adjustment device 10 with fine-tuning characteristic of the present invention can adjust the height of the projector 100 both in a large scale and in fine scale through a transformation gear set comprised by the first gear 40 and the second gear 50. Since the first gear 40 has its shaft arranged in a line with the shaft of the second gear 50, the shaft 45 been the common shaft, the first gear 40 and the second gear 50 are in-line gears with same rotational speed. The base 20 is configured at the bottom of the housing 110 of the projector 100 and the first gear 40 and the second gear 50 are configured on the base 20 through the shaft 45.

The supporter 30 supports the projector 100 on the desk when practically at least two supporters 30 should be used at two sides of the bottom of the projector 100. The supporter 30 has a rack 32 having a plurality of teeth for being capable of moving relative to the base 20 and the transformation gear set and engaging with the transformation gear set. The actuator 70 allows the user to press and is also configured on the base 20. FIG. 2 shows that a needle 72 of the actuator 70 can engage with the first gear 40 and a spring 74 connects between the needle 72 and the base 20.

Figure 4:
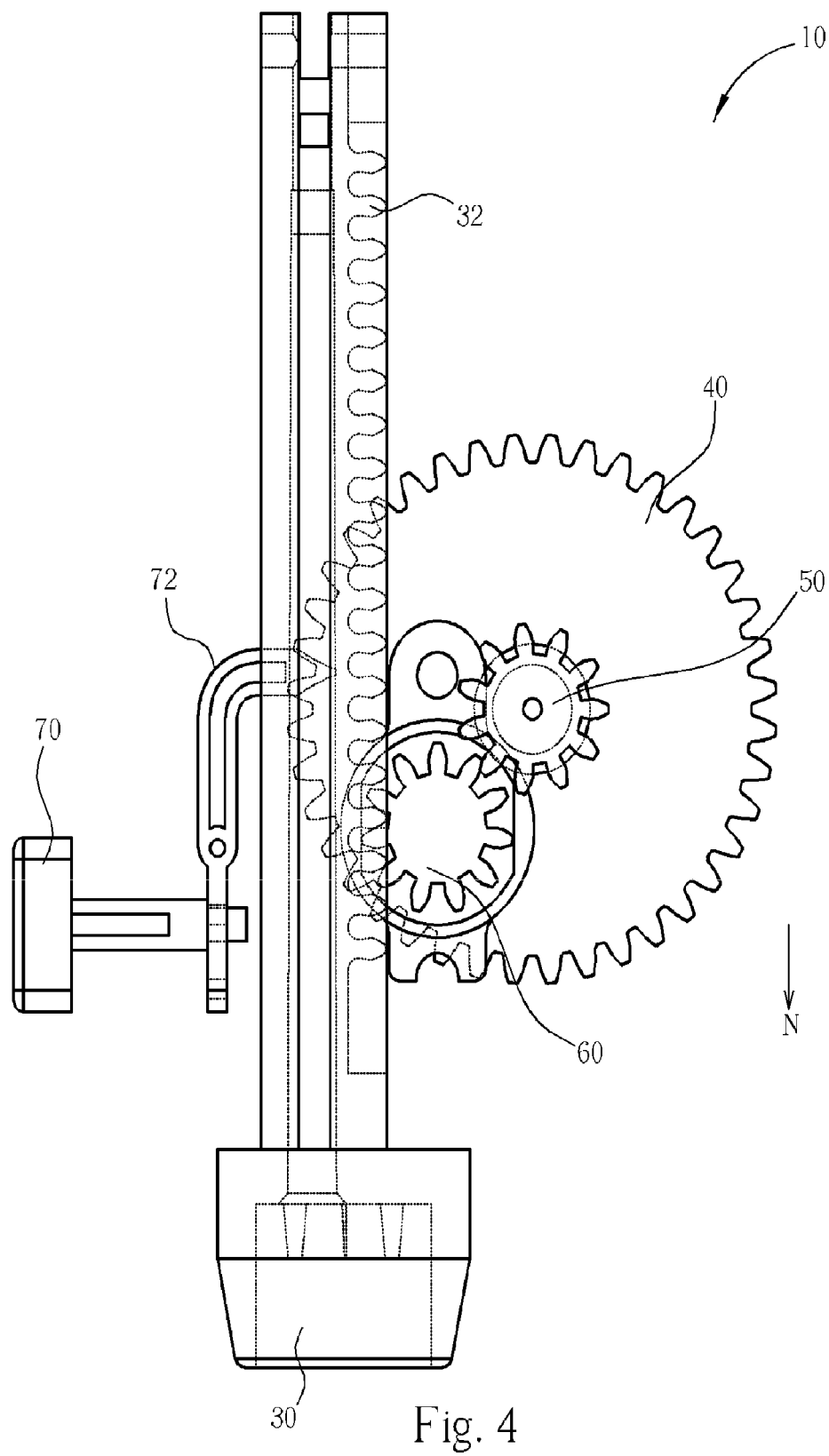
FIG. 4 is an illustration of cross-section view of the height adjustment device when the actuator is not pressed.

Please refer to FIG. 4. FIG. 4 is an illustration of cross-section view of the height adjustment device 10 when the needle 72 engages with the first gear 40, or the actuator 70 is not pressed. In this phase, the needle 72 engages with the first gear 40, the in-line second gear 50 engages with the damping gear 60, and the damping gear 60 engages with the rack 32; therefore, the transformation gear set is locked and the supporter 30 is also locked and restricted in moving in the direction N.

Figure 5:
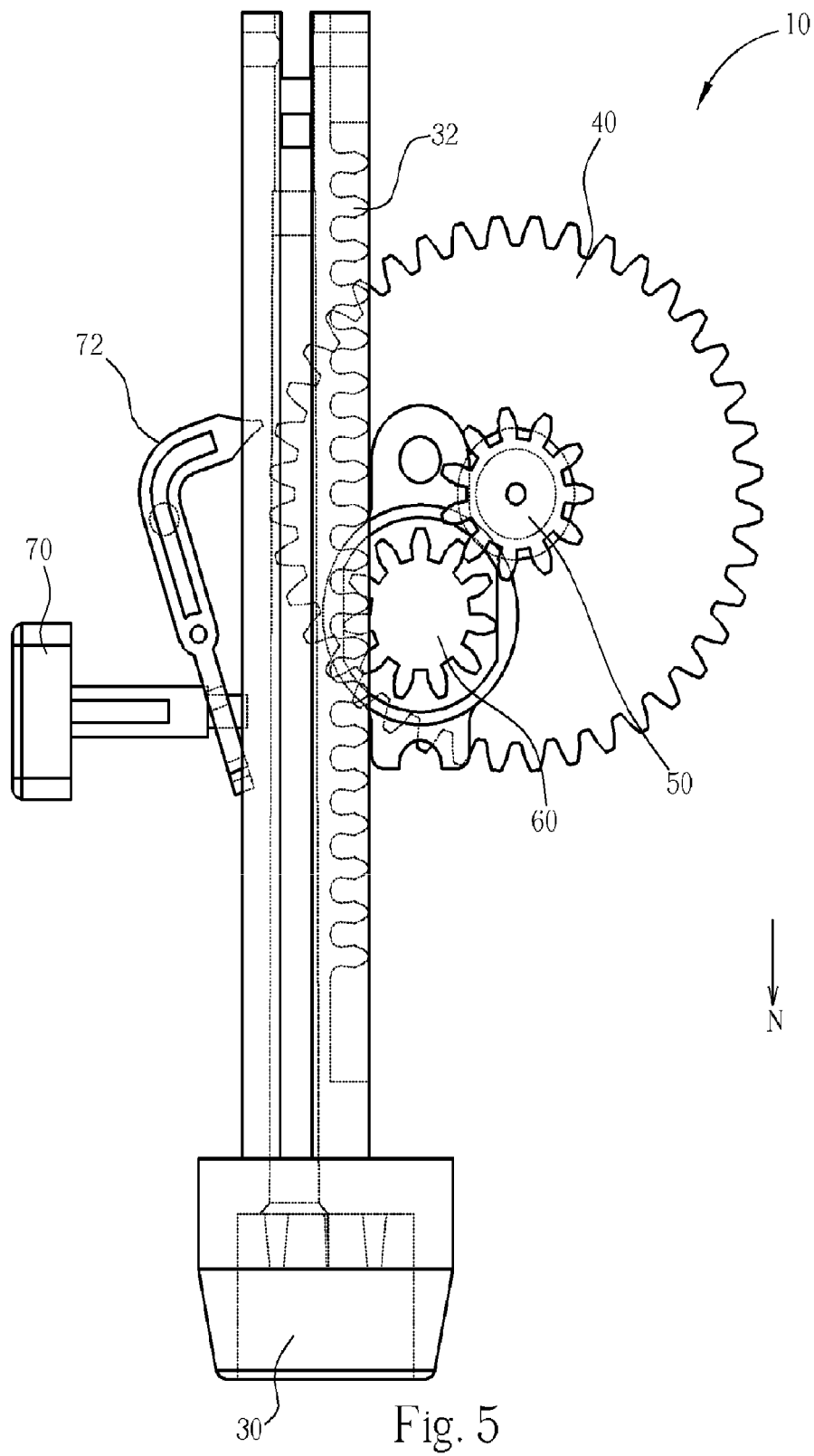
FIG. 5 is an illustration of cross-section view of the height adjustment device when the actuator is pressed.

Please refer to FIG. 5. FIG. 5 is an illustration of cross-section view of the height adjustment device 10 when the needle 72 disengages from the first gear 40, or the actuator 70 is pressed. When the user presses the actuator 70, the needle 72 disengages with the first gear 40 and pulls the spring 74 to extend. In this phase, the first gear 40 and the second gear 50 are rotatable and the damping gear 60 is also rotatable. The rack 32 is moveable relative to the damping gear 60 such that the supporter 30 can move relative to the base 20 to adjust the height of the projector 100. A constant force spring 34 is configured between the supporter 30 and a mounting section 22 of the base 20 (the connection between the mounting section 22 and the base 20 is not shown in the figure). When the rack 32 can move relative to the damping gear 60, the constant force spring 34 pulls the supporter 30 toward direction N to adjust the height adjustment device 10 in a large scale. Meanwhile, the damping gear 60 engaging between the second gear 50 and the rack 32 provides a deceleration drag for the rack 32 for preventing the supporter 30 from being pulled by the constant force spring 34 toward direction N too quickly. When the user stops pressing the actuator 70, the extended spring 74 pulls the needle 72 to engage with the first gear 40 again and the height adjustment device 10 returns to the phase as in FIG. 4.

In other exemplary embodiments of the height adjustment device 10 of the present invention, the second gear 50 can directly engage with the rack 32 without further introducing the damping gear 60 as in the exemplary embodiment aforementioned. Furthermore, the damping gear 60 and the constant force spring 34 can be totally removed from the height adjustment device in other exemplary embodiments and the height adjustment device can still accomplish the purpose of the present invention by the actuator 70, the transformation gear set (including the first gear 40 and the second gear 50), and the supporter 30.

Previously disclosed, the height adjustment device 10 of the present invention is capable of adjust the height of the supporter 30 both in a large scale and in a fine scale by the transformation gear set. In the exemplary embodiment disclosed, the pitch diameter of the first gear 40 is larger than that of the second gear 50 with 40 teeth on the first gear 40 and 10 teeth on the second gear 50. Since the first gear 40 and the second gear 50 have their shafts arranged in a line with each other, the circular distance rate between the first gear 40 and the second gear 50 is 4 to 1. When the height adjustment device 10 is adjustable as shown in FIG. 5 and when the first gear 40 rotates for a circular pitch relative to the needle 72, the second gear 50 rotates for ¼ circular pitch, which causes the rack 32 to move for ¼ circular pitch (or the damping gear 60 drives the rack 32 to move for ¼ circular pitch). This means that one circular pitch adjustment to the first gear 40 from the actuator 70 can result in ¼ circular pitch adjustment to the supporter 30. The precision for adjusting the height of the projector is promoted by four times with the height adjustment device 10 disclosed by the present invention. However, the ratio between the pitch diameters of the first 40 and the second gear 50 can be of any other possibility according to design requirement and the example mentioned above should not limit the disclosure of the present invention.

The height adjustment device disclosed in the present invention can be applied on many devices, such as image systems, specifically the projectors, with height adjustment requirements. Through combination of gears with different sizes in a transformation gear set configured in the height adjustment device, the height adjustment device can be fine-tuned. When an actuator of the height adjustment device is pressed, a first gear engaging with the actuator rotates and has a first relative distance with the actuator while a second gear engaging with a rack of the supporter has a second relative distance with the rack. The second relative distance is shorter than the first relative distance and the supporter is adjusted in a large scale and is fine-tuned through operating one single actuator.

Those skilled in the art will readily observe that numerous modifications and alterations of the device and method may be made while retaining the teachings of the invention.

What is claimed is:

1. An image system having height adjustment device with fine tuning, the image system comprising:
    a housing;
    a lens set configured in the housing for casting an image onto a surface; and
    two height adjustment devices configured at the bottom of the housing respectively, the height adjustment device comprising:
        a base connected to the bottom of the housing;
        a transformation gear set configured on the base and having a first gear and a second gear, wherein the first gear and the second gear are in-line gears and the pitch diameter of the first gear is larger than the pitch diameter of the second gear;
        a supporter capable of moving relative to the base and having a rack for engaging with the second gear of the transformation gear set; and
        an actuator configured on the base for detachably engaging with the first gear of the transformation gear set for stopping the first gear and the second gear;

wherein when the actuator disengages from the first gear and when the first gear rotates and has a first relative distance with the actuator, the second gear rotates and has a second relative distance with the racks and the first relative distance is longer than the second relative distance.

2. The image system of claim 1, further comprising a third gear wherein the second gear engages with the rack through the third gear.

3. The image system of claim 2, wherein the third gear is a damping gear for providing a deceleration drag for the supporter when engaging with the rack.

4. The image system of claim 1, wherein the actuator comprises a needle for engaging with the first gear.

5. The image system of claim 4, further comprising a first elastic element connecting between the needle and the base for forcing the needle to engage with the first gear.

6. The image system of claim 1, further comprising a second elastic element connecting between the supporter and the base.

7. The image system of claim 6, wherein the second elastic element is a constant force spring.

8. An image system having height adjustment device with fine tuning, the image system comprising:
 a housing;
 a lens set configured in the housing for casting an image onto a surface; and
 two height adjustment devices configured at the bottom of the housing respectively, the height adjustment device comprising:
  a base connected to the bottom of the housing;
  a transformation gear set configured on the base and having a first gear and a second gear, wherein the first gear and the second gear are in-line gears;
  a third gear;
  a supporter capable of moving relative to the base and having a rack for engaging with the second gear of the transformation gear set through the third gear; and
  an actuator configured on the base for detachably engaging with the first gear of the transformation gear set for stopping the first gear and the second gear;
  wherein when the actuator disengages from the first gear and when the first gear rotates and has a first relative distance with the actuator, the second gear rotates and has a second relative distance with the racks and the first relative distance is longer than the second relative distance.

9. The image system of claim 8, wherein the third gear is a damping gear for providing a deceleration drag for the supporter when engaging with the rack.

10. The image system of claim 8, wherein the actuator comprises a needle for engaging with the first gear.

11. The image system of claim 10, further comprising a first elastic element connecting between the needle and the base for forcing the needle to engage with the first gear.

12. The image system of claim 8, further comprising a second elastic element connecting between the supporter and the base.

13. The image system of claim 12, wherein the second elastic element is a constant force spring.

14. An image system having height adjustment device with fine tuning, the image system comprising:
 a housing;
 a lens set configured in the housing for casting an image onto a surface; and
 two height adjustment devices configured at the bottom of the housing respectively, the height adjustment device comprising:
  a base connected to the bottom of the housing;
  a transformation gear set configured on the base and having a first gear and a second gear;
  a supporter capable of moving relative to the base and having a rack for engaging with the second gear of the transformation gear set; and
  an actuator configured on the base for detachably engaging with the first gear of the transformation gear set for stopping the first gear and the second gear, the actuator comprising a needle for engaging with the first gear;
  wherein when the actuator disengages from the first gear and when the first gear rotates and has a first relative distance with the actuator, the second gear rotates and has a second relative distance with the racks and the first relative distance is longer than the second relative distance.

15. The image system of claim 14, further comprising a first elastic element connecting between the needle and the base for forcing the needle to engage with the first gear.

16. The image system of claim 14, further comprising a second elastic element connecting between the supporter and the base.

17. The image system of claim 16, wherein the second elastic element is a constant force spring.

* * * * *